United States Patent
Van der Zee et al.

(10) Patent No.: US 11,071,023 B2
(45) Date of Patent: Jul. 20, 2021

(54) WIRELESS DEVICE AND METHODS THEREIN FOR HANDLING CELL SELECTION AND/OR RESELECTION

(71) Applicant: Telefonaktiebolaget LM Ericsson (publ), Stockholm (SE)

(72) Inventors: Martin Van der Zee, Malmö (SE); Olof Liberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/625,035

(22) PCT Filed: Jul. 6, 2018

(86) PCT No.: PCT/SE2018/050739
§ 371 (c)(1),
(2) Date: Dec. 20, 2019

(87) PCT Pub. No.: WO2019/032008
PCT Pub. Date: Feb. 14, 2019

(65) Prior Publication Data
US 2020/0221354 A1    Jul. 9, 2020

Related U.S. Application Data

(60) Provisional application No. 62/543,439, filed on Aug. 10, 2017.

(51) Int. Cl.
*H04W 36/00* (2009.01)
*H04W 4/70* (2018.01)
(Continued)

(52) U.S. Cl.
CPC ......... *H04W 36/0058* (2018.08); *H04W 4/70* (2018.02); *H04W 36/0085* (2018.08); *H04W 36/08* (2013.01); *H04W 48/20* (2013.01)

(58) Field of Classification Search
CPC .............. H04W 36/0058; H04W 4/70; H04W 36/0085; H04W 36/08; H04W 48/20
See application file for complete search history.

(56) References Cited

U.S. PATENT DOCUMENTS

2017/0118701 A1* 4/2017 Kim ................. H04W 48/20
2018/0279143 A1* 9/2018 Bhattad ............ H04W 48/12

OTHER PUBLICATIONS

Unknown, Author, "3rd Generation Partnership Project; Technical Specification Group Radio Access Network; Evolved Universal Terrestrial Radio Access (E-UTRA); User Equipment (UE) procedures in idle mode (Release 13)", 3GPP TS 36.304 V13.1.0, Mar. 2016, pp. 1-43.

(Continued)

*Primary Examiner* — Nam T Huynh
(74) *Attorney, Agent, or Firm* — Sage Patent Group

(57) ABSTRACT

A method by a wireless device (130) is described herein. The device (130), having determined that a measurement of a signal from a cell (121) is below a threshold, determines (301) that at least one of: i) a length of time since the device (130) last performed cell selection or reselection is above a second threshold, and ii) a number of times that neighbor cell measurements failed to trigger cell reselection is above a third threshold. Based on the determination, the device (130) resets (302) a strongest signal value of the signal measured after a last cell selection or reselection, to a lower value. The wireless device (130) determines (303) whether or not to measure another cell (122), based on whether or not a difference between: a) the reset value and b) a current measurement of the signal, is above a fourth threshold. The wireless device (130) then initiates (304) measuring the other cell (122) based on the determination.

15 Claims, 7 Drawing Sheets

(51) Int. Cl.
  *H04W 36/08* (2009.01)
  *H04W 48/20* (2009.01)

(56) References Cited

OTHER PUBLICATIONS

Unknown, Author, "3rd Generation Partnership Project; Technical Specification Group Radio Access Network; GSM/EDGE Radio subsystem link control (Release 14)", 3GPP TS 45.008 V14.1.0, Jun. 2017, pp. 1-166.
Unknown, Author, "PEO reselection updates", 3GPP TSG GERAN WG3#70; GP-160385; Nanjing, PRC, May 24-26, 2016, pp. 1-3.
Unknown, Author, "Relaxed monitoring in NB-IoT", 3GPP TSG-RAN2 Meeting #99; R2-1708273; Berlin, Germany, Aug. 21-25, 2017, pp. 1-10.
Unknown, Author, "Relaxed Monitoring in NB-IoT", 3GPP TSG-RAN2 Meeting #100; R2-1713012; Reno, US, Nov. 27-Dec. 1, 2017, pp. 1-3.

* cited by examiner a)

b)

a)

b)

a)

b)

WIRELESS DEVICE AND METHODS THEREIN FOR HANDLING CELL SELECTION AND/OR RESELECTION

TECHNICAL FIELD

The present disclosure relates generally to a wireless device and methods performed thereby for handling cell selection and/or reselection. The present disclosure further relates generally to a computer program product, comprising instructions to carry out the actions described herein, as performed by the communication device. The computer program product may be stored on a computer-readable storage medium.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g., a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Cell Selection and Re-Selection

In a wireless communications system, such as a cellular network, a wireless device, e.g., a wireless device, is periodically monitoring the surrounding radio environment, in order for the wireless device to be connected to the most suitable cell, e.g., to the most suitable radio base station serving the cell, or at least to a suitable cell. The selection of the suitable cell may be based on network decision or by autonomous mobile decision. It should be understood that the expression "the wireless device is connected to a cell" or similar is to be interpreted as that the wireless device is connected to a network node, e.g. a radio base station or a similar device, that serves or provides radio coverage in a geographical area referred to as the cell. Further, it should be understood that sometimes herein reference is made to the cell and the network node serving the cell interchangeably. Thus, sometimes when a reference is made to the cell it should be interpreted as a reference to the network node serving the cell. However, it should be understood that several cells may be served by the same network node.

The initial process to select a cell by searching possible different alternatives is usually referred to as cell selection. The process of periodically monitoring cells and, after an initial cell selection, deciding to move to another cell based on the information acquired through monitoring is usually referred to as a cell reselection procedure.

For cell reselection, the process typically involves monitoring different signal strengths from different cells, e.g., from different radio base stations or from different cells served by the same base station, and ordering them in descending order. That is, the stronger the signal strength from the cell is, the more suitable is the cell to camp on. In case all cells being monitored are weak in signal strength, there is typically a minimum allowed signal strength for a cell to be considered as a suitable cell by the wireless device. Herein, reselection and re-selection are used indistinctively.

By the expression "camp on" when used in this disclosure is meant that the wireless device is served by the network node serving the cell the wireless device is camping on. Sometimes in this disclosure, the cell the wireless device is camping on is referred to as a serving cell. Further, sometimes herein the expressions "cell camped on" and "serving cell" are used interchangeably.

By frequently monitoring the surrounding radio environment the wireless device may be ensured to be camping on the cell serving the wireless device with the strongest signal strength, or at least one of the stronger cells, given its current position. In case the wireless device is moving around, the radio environment will change. Hence, to be fully up to date on the surrounding radio environment, the wireless device would have to frequently search for and monitor neighboring cells and to monitor the serving cell, in order to understand the changes over time. This procedure consumes energy, and it will more quickly drain the battery, the more frequently these search procedures are performed. That is a drawback for a wireless device that is dependent on a battery for power.

Although there are wireless devices that benefit from frequent cell-reselection procedures, there are other classes of wireless devices that rather trade a longer battery lifetime for a sub-optimum cell re-selection procedure. At the same time, it is always of interest for any wireless device to be connected to the best cell, e.g., to the cell having the highest signal strength, or at least to a good cell, e.g., to a cell having a high signal strength, to minimize interference levels in the communications network, and hence minimize transmission and/or reception times.

Machine-to-Machine (M2M) and Internet of Things (IoT)

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories (Category M1 (Cat-M1), Category M2 (Cat-M2)), supporting reduced bandwidth of 6 physical resource blocks (PRBs)—up to 24 PRBs for Cat-M2-, and Narrowband IoT (NB-IoT) UEs providing a new radio interface—and UE categories, Cat-NB1 and Cat-NB2-.

The LTE enhancements introduced in 3GPP Release 13, 14 and 15 for MTC are referred to herein as enhanced Machine-Type Communications (eMTC), including—not limiting—support for bandwidth limited UEs, Cat-M1, and support for coverage enhancements. This is to separate discussion from NB-IoT—notation here used for any Release-, although the supported features are similar on a general level.

There are multiple differences between "legacy" LTE and the procedures and channels defined for eMTC and for NB-IoT. Some important differences include new physical channels, such as the physical downlink control channels, called MTC Physical Downlink Control Channel (MPDCCH) in eMTC and Narrowband Physical Downlink Control Channel (NPDCCH) in NB-IoT, and a new physical random access channel, NB-IoT Physical Random Access Channel (NPRACH), for NB-IoT.

The REL-15, work item objectives for NB-IoT and MTC have a similar objective for power savings. A first objective is relaxed monitoring for cell reselection, e.g., in RAN2, and RAN4. The second objective is to enable relaxed UE monitoring for cell (re)selection e.g., by (re)configuration.

The relaxed monitoring rules specify when the UE may need to perform neighbor cell measurements in Idle mode. In general, the UE may perform both serving cell measurements and neighbor cell measurements. When the serving cell quality deteriorates, for example because the UE is moving, and drops below a certain threshold, the UE triggers neighbor cell measurements to check if there is a better neighbor cell to re-select to. However, in NB-IoT and MTC, there may be use cases where the UE is stationary while the UE is in deep coverage—e.g., an indoor UE in the basement attached to the wall. Such a UE is typically below the measurement threshold, and would be required to continuously measure for neighbor cells. However, such a UE may not measure any suitable neighbor cells, or neighbor cells that are of a better quality than the serving cell. According to existing methods, such a UE should be required to continuously perform neighbor cell measurements, which would drain the battery, and result in an unnecessary waste of signalling resources.

SUMMARY

It is an object of embodiments herein to improve the handling of cell selection and/or reselection by a wireless device in a wireless communications network.

According to a first aspect of embodiments herein, the object is achieved by a method, performed by a wireless device. The method is for handling cell selection and/or reselection. The wireless device operates in a wireless communications network. The wireless communications network has a first cell and a second cell. The wireless device has determined that a result of a first measurement of a first signal from the first cell is that the first measurement is below a first threshold. The wireless device determines that at least one of: i) a length of time since the wireless device last performed cell selection or reselection is above a second threshold, and ii) a number of times that neighbor cell measurements failed to trigger cell reselection is above a third threshold. The wireless device then resets a strongest signal value of the first signal measured after a last cell selection or reselection by the wireless device, to a lower value. The resetting is done based on a first result of the determination of at least one of: the length of time and the number of times. The wireless device further determines whether or not to measure a second signal from the second cell. This is performed based on whether or not a difference between: a) the reset strongest signal value of the first signal measured after the last cell selection or reselection by the wireless device and b) a current measurement of the first signal from the first cell, is above a fourth threshold. Finally, the wireless device initiates measuring the second signal based on a second result of the determination of whether or not to measure.

According to a second aspect of embodiments herein, the object is achieved by a wireless device, configured to handle cell selection and/or reselection. The wireless device is further configured to operate in the wireless communications network. The wireless communications network is configured to have the first cell and the second cell. The wireless device is further configured to, having determined that the result of the first measurement of the first signal from the first cell is that the first measurement is below the first threshold, to make a determination. The determination is that at least one of: i) the length of time since the wireless device last performed cell selection or reselection is above the second threshold, and ii) the number of times that neighbor cell measurements failed to trigger cell reselection is above the third threshold. The wireless device is further configured to reset the strongest signal value of the first signal measured after the last cell selection or reselection by the wireless device, to the lower value based on the first result of the determination of at least one of: the length of time and the number of times. The wireless device is also configured to determine whether or not to measure the second signal from the second cell. This is configured to be performed based on whether or not a the difference between: a) the strongest signal value of the first signal measured after the last cell selection or reselection by the wireless device, configured to be reset, and b) the current measurement of the first signal from the first cell, is above the fourth threshold. The wireless device is finally configured to initiate to measure the second signal based on the second result of the determination of whether or not to measure.

According to a third aspect of embodiments herein, the object is achieved by a computer program, comprising instructions which, when executed on at least one processor, cause the at least one processor to carry out the method performed by the wireless device.

According to a fourth aspect of embodiments herein, the object is achieved by a computer-readable storage medium, having stored thereon the computer program, comprising instructions which, when executed on at least one processor, cause the at least one processor to carry out the method performed by the wireless device.

By the wireless device determining that either the length of time since the wireless device last performed cell selection and/or reselection is above the second threshold, or the number of times that neighbor cell measurements failed to trigger cell reselection is above the third threshold, or both, it may be concluded that no stronger neighbor may have actually been measured for a certain amount of time. That is, that there may be no better neighbor cell yet to re-select to. This may be due to the fact, for example, that the wireless device may have become stationary at this point in time, that is, that the wireless device may, e.g., have moved towards the border of the serving cell, but has become stationary in the cell border area, where the second signal from the neighbor cell may not be yet stronger to re-select to. In such cases, the wireless device may detect a drop in the first signal of the serving cell. However, if the wireless device were to measure the second signal from the neighbor cell, although the trigger condition for neighbor cell measurements may remain fulfilled, the wireless device would not measure any better neighbor cells to re-select to. By the wireless device resetting the strongest signal value to the lower value and then determining herein whether or not to measure the second signal from the second, e.g., neighbor, cell, based on whether or not the difference between: a) the reset strongest signal value of the first signal measured after the last cell selection or reselection by the wireless device and b) the current measurement of the first signal from the serving cell, is above the fourth threshold, the wireless device is enabled to relax the requirements for monitoring for cell selection and/or reselection, and may refrain from continuing to perform neighbor measurements in the hope to find a better neighbor cell. Therefore, the wireless device may save power as well as time-frequency resources.

BRIEF DESCRIPTION OF THE DRAWINGS

Examples of embodiments herein are described in more detail with reference to the accompanying drawings, according to the following description.

DETAILED DESCRIPTION

Terminology

Figure 1:
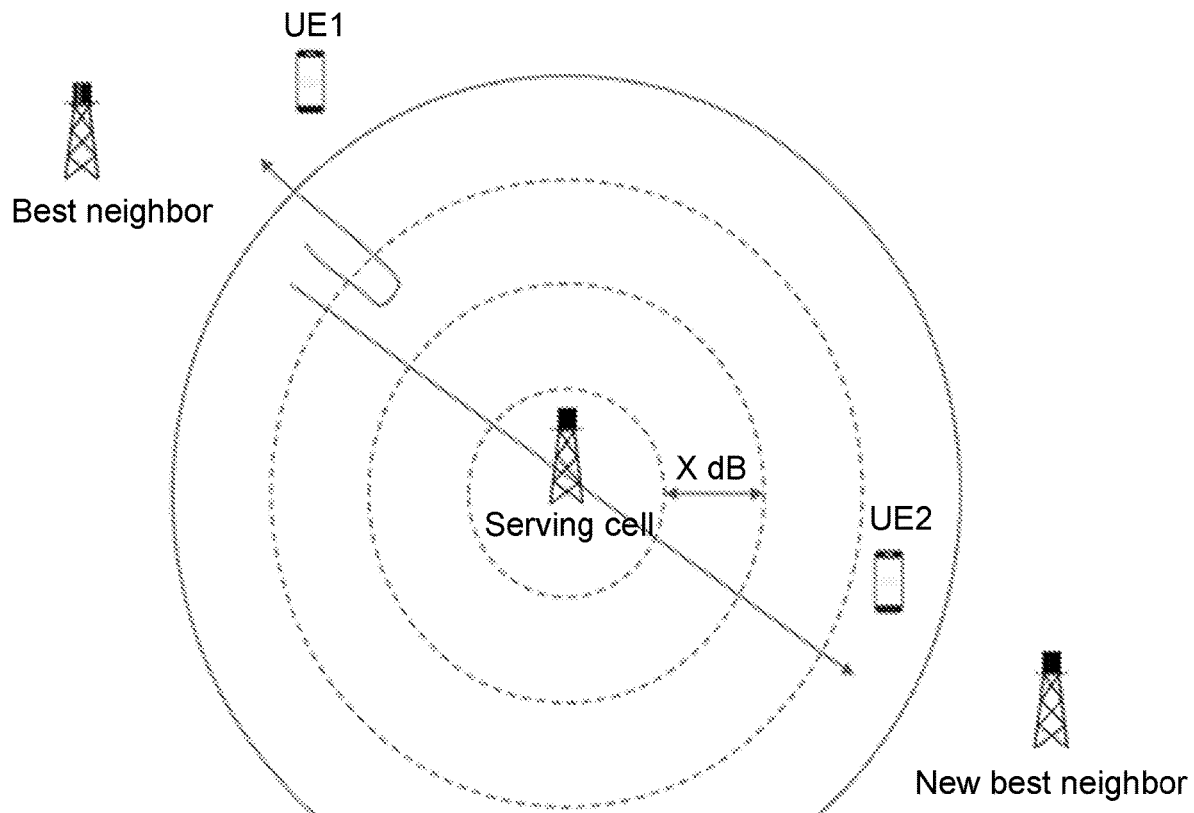
FIG. 1 is a schematic diagram illustrating UE mobility and serving cell measurements.

The following commonly terminologies may be used in the embodiments and are elaborated below:

Network node: In some embodiments generic terminology "network node", is used. It can be any kind of network node which may comprise of a radio network node such as base station, radio base station, base transceiver station, base station controller, network controller, multi-standard radio BS, gNB, New Radio (NR) BS, evolved Node B (eNB), Node B, Multi-cell/multicast Coordination Entity (MCE), relay node, access point, radio access point, Remote Radio Unit (RRU), Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

Radio network node: In some embodiments, the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

User equipment: In some embodiments, the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPad, Tablet, mobile terminals, smart phone, laptop embedded equipped (LEE), laptop mounted equipment (LME), USB dongles, Customer Premises Equipment (CPE) etc.

The term "signal" used herein may refer to a radio signal. The term "signal" used herein may comprise any of: a high-layer signal, e.g., via Radio Resource Control (RRC) or the like, a lower-layer signal, e.g., via a physical control channel or a broadcast channel, or a combination thereof. The signal may be implicit or explicit. The signal may further be unicast, multicast or broadcast. The signal may also be directly to another node or via a third node.

The term "measurement" used herein may refer to any measurement performed on radio signals. Measurement as used herein may be understood to refer to a radio measurement. Measurements can be absolute or relative. A measurement may be understood as a signal level, which may be signal quality and/or signal strength. Measurements may be e.g., intra-frequency, inter-frequency, inter-RAT measurements, etc. Radio measurements may be unidirectional, e.g., DL or UL, or bidirectional, e.g., Round Trip Time (RTT), Reception-Transmission (Rx-Tx), etc. Some examples of radio measurements: timing measurements, e.g., Time Of Arrival (TOA), timing advance, RTT, Reference Signal Time Difference (RSTD), Rx-Tx, propagation delay, etc., angle measurements, e.g., angle of arrival (AOA), power-based measurements, e.g., received signal power, such as Reference Signal Received Power (RSRP), received signal quality, such as Reference Signal Received Quality (RSRQ), Signal to Interference Noise Ratio (SINR), Signal to Noise Ratio (SNR), interference power, total interference plus noise, Received Signal Strength Indication (RSSI), noise power, etc., cell detection or cell identification, Radio Link Monitoring (RLM), System Information (SI) reading, etc. The inter-frequency and inter-RAT measurements may be carried out by the UE in measurement gaps unless the UE is capable of doing such measurement without gaps. Examples of measurement gaps are measurement gap id #0, each gap of 6 ms occurring every 40 ms, measurement gap id #1, each gap of 6 ms occurring every 80 ms, etc. The measurement gaps may be configured at the UE by the network node.

Performing a measurement on a carrier may imply performing measurements on signals of one or more cells operating on that carrier or performing measurements on signals of the carrier, a.k.a. carrier specific measurement e.g., RSSI. Examples of cell specific measurements are signal strength, signal quality etc.

As part of developing embodiments herein, one or more problems that may be associated with use of at least some of the prior art methods, and that may be addressed by embodiments herein, will first be identified and discussed.

In Extended Coverage Global System for Mobile communications (EC-GSM) an approach has been specified in TS 45.008, V14.1.0 (2017-06), section 6.6.1a.2 "Monitoring of the serving cell", where the UE triggers neighbor cell measurements, when a certain drop (dB) in the serving cell quality is measured, i.e., UE mobility has been observed, as depicted in e.g., FIG. 1. FIG. 1 is a schematic diagram illustrating two different wireless devices, UE1 and UE2 moving around in their serving cell, illustrated as a solid circle. The movement of the wireless devices is indicated by unidirectional arrows. The area of the cell is characterized by different drops in the serving cell quality, as measured by the wireless devices. The different drops are indicated by concentric circles. Initially, the two wireless devices are located at the edge of the cell, closer to a best neighbor cell, according to their measurements. This would be the position indicated by the beginning of the arrows, UE 1 moves out of the serving cell, closer to the best neighbor cell, and reselects the latter, while UE 2 moves to the edge of the serving cell in the opposite direction, and its measurements find a new best neighbor cell provides a better signal.

For NB-IoT and MTC, a similar approach is being proposed. However, the current mobility detection algorithm suffers from the following drawback:

$$\text{Strongest}_{serving} - \text{Current}_{serving} > \text{Delta}_{SI}$$

With:
  $\text{Strongest}_{serving}$: Strongest serving cell Narrowband Reference Signal Received Power (NRSRP) after last cell (re-)selection
  $\text{Current}_{serving}$: Current serving cell NRSRP
  $\text{Delta}_{SI}$: Threshold in system information (dB)

It is possible that the UE detects a drop in the serving cell, and for that reason neighbor cells measurements are justified. However, when the UE performs those neighbor cell measurements, no stronger neighbor is actually measured, i.e., there is no better neighbor cell yet to re-select to. It is possible that the UE has become stationary at this point in time, i.e., the UE moved towards the cell border, but has become stationary in the cell border area, where neighbor cells are not yet stronger to re-select to. In such case, the trigger condition for neighbor cell measurements remains fulfilled, but the UE will not measure any better neighbor cells to re-select to.

Embodiments herein address this problem. Embodiments herein may be understood to relate to providing optimized neighbor cell measurements. As a summarized overview, the problem just presented may be avoided, when the UE may discard the "strongest serving cell NRSRP" after some time, which may be used to detect mobility in the UE, and may be used to trigger neighbor cell measurements: For example, the "strongest serving cell NRSRP" may be reset to be the "current serving cell NRSRP" after a certain time has passed:

$$\text{Strongest}_{serving} = \text{Current}_{serving} \text{ after } T_{StrongestSrxlev}$$

An alternative to discarding the strongest serving cell measurements after some time is that the UE may discard the strongest serving cell measurements after N consecutive neighbor cell measurements that did not trigger a cell reselection.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Other wireless systems, including NR, Wideband Code Division Multiple Access (WCDMA), Worldwide Interoperability for Microwave Access (WiMax), Ultra-Mobile Broadband (UMB) and Global System for Mobile communications (GSM), may also benefit from exploiting the ideas covered within this disclosure.

Figure 2:
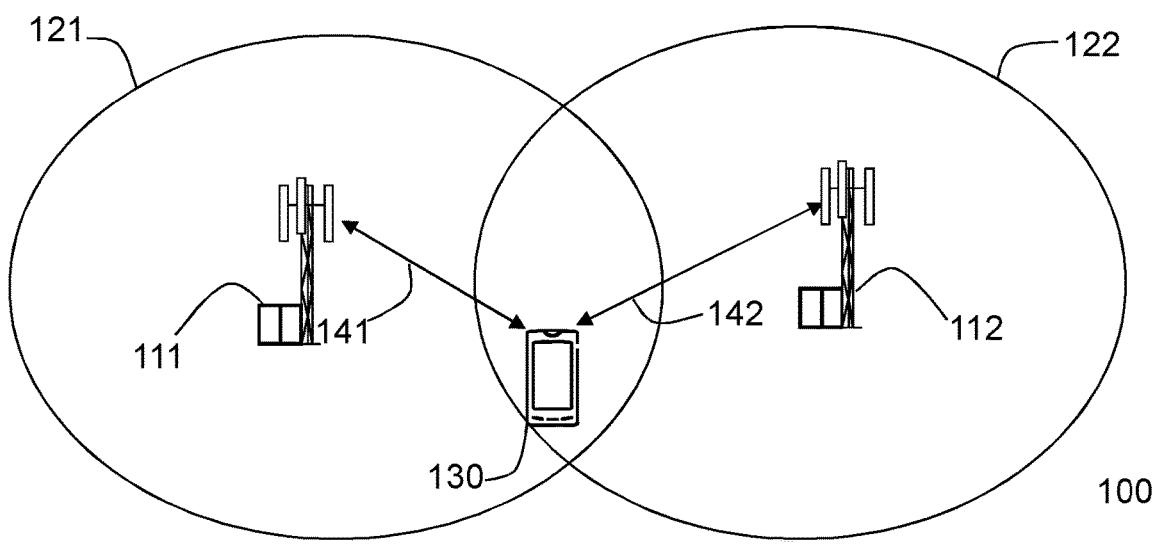
FIG. 2 is a schematic diagram illustrating embodiments of a wireless communications network, according to embodiments herein.
Figure 2:
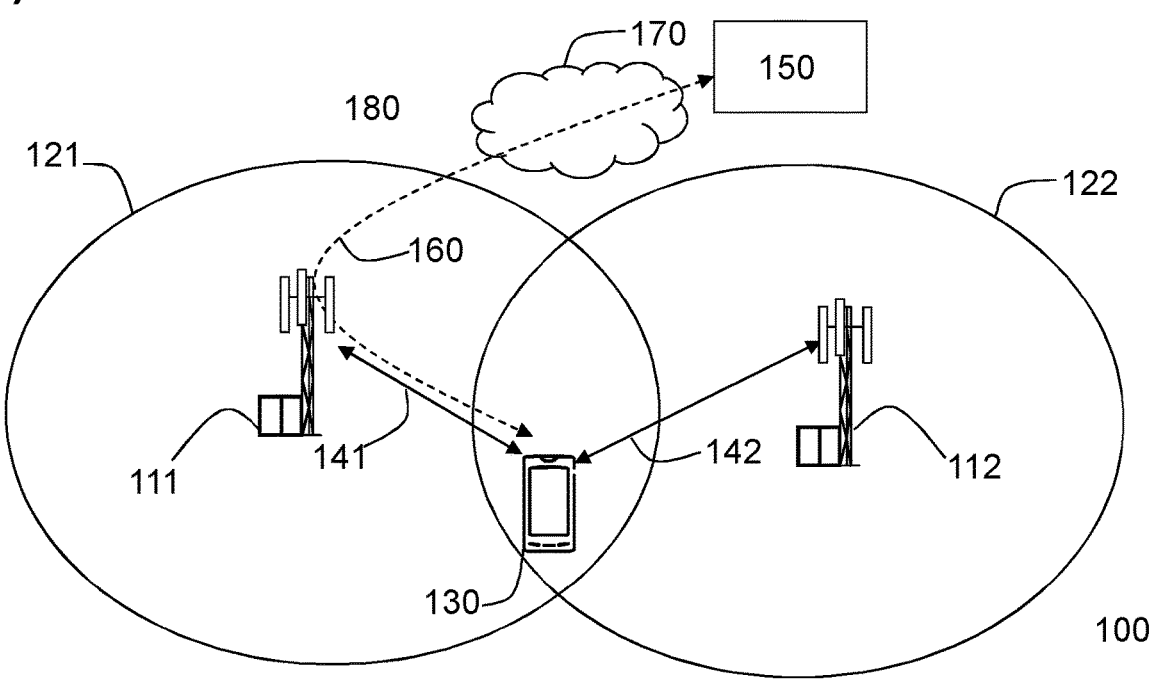

FIG. 2 depicts two non-limiting examples, in FIGS. 2a, and 2b respectively, of a wireless communications network 100, sometimes also referred to as a wireless communications system, cellular radio system, or cellular network, in which embodiments herein may be implemented. The wireless communications network 100 may typically be an NB-IoT network or an MTC network, e.g., eMTC network, a Long-Term Evolution (LTE) network, e.g., LTE Frequency Division Duplex (FDD), LTE Time Division Duplex (TDD), LTE Half-Duplex Frequency Division Duplex (HD-FDD), or LTE operating in an unlicensed band network. The wireless communications network 100 may support other technologies such as, for example, a 5G system, 5G network, or Next Gen System or network, WCDMA, Universal Terrestrial Radio Access (UTRA) TDD, GSM network, GSM EDGE Radio Access Network (GERAN) network, Ultra-Mobile Broadband (UMB), Enhanced Data rates for GSM Evolution (EDGE) network, network comprising any combination of Radio Access Technologies (RATs) such as, e.g., Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of network nodes, whereof a first network node 111, also referred to herein as a serving network node 111, and a second network node 112, also referred to herein as a neighbor network node 112, are depicted in the non-limiting examples of FIG. 2. Each of the first network node 111, and the second network node 112 may be radio network nodes. In a non-limiting scenario, depicted in FIG. 2a and FIG. 2b, the first network node 111 and the second network node 112 may be different nodes. In other examples, the first network node 111 and the second network node 112 may be co-located, or be the same node. In other examples, which are not depicted in FIG. 2, the first network node 111 may be a distributed node, such as a virtual node in the cloud, and may perform its functions entirely on the cloud, or partially, in collaboration with a radio network node.

Each of the first network node 111, and the second network node 112 may be an eNB. That is, a transmission point such as a radio base station, for example, an eNodeB, or a Home Node B, an Home eNode B, a gNB, or any other network node capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 comprises at least a serving cell 121, also referred to herein as a first cell 121, and may comprise at least a neighbor cell 122, also referred to herein as a second cell 122. In the non-limiting example depicted in FIG. 2, the first network node 111 serves the first cell 121, and the second network node 112 serves the second cell 122. Even in examples wherein the wireless communications network 100 may not be referred to as a cellular system, if each of the first network node 111 and the second network node 112 may serve receiving nodes, such as wireless devices, with serving beams, the areas of coverage of the beams may still be referred to as cells. Each of the first network node 111, and the second network node 112 may be of different classes, such as, e.g., macro eNodeB, home eNodeB or pico base station, based on transmission power and thereby also cell size. Each of the first network node 111, and the second network node 112 may support one or several communication technologies, and its name may depend on the technology and terminology used. In LTE, each of the second network node 112 and the second network node 112, which may be referred to as eNBs, may be directly connected to one or more core networks, which are not depicted in FIG. 2.

A plurality of wireless devices are located in the wireless communication network 100, whereof a wireless device 130, is depicted in the non-limiting examples of FIG. 2. The wireless device 130 comprised in the wireless communications network 100 may be a wireless communication device such as a UE, or a 5G UE, which may also be known as e.g., a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a tablet with wireless capability, Machine-to-Machine (M2M) device, device equipped with a wireless interface, such as a printer or a file storage device, modem, or any other radio network unit capable of communicating over a radio link in a communications system. The wireless device 130 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the first network node 111 over a first link 141, e.g., a radio link. The wireless device 130 may be configured to communicate within the wireless communications network 100 with the second network node 112 over a second link 142, e.g., a radio link.

In some embodiments, the wireless communications network 100 may be connected to a host computer 150, which is depicted in the example of FIG. 2b. The host computer 150 may be embodied in the hardware and/or software of a standalone server, a cloud-implemented server, a distributed server or as processing resources in a server farm. The host computer 150 may be under the ownership or control of a service provider, or may be operated by the service provider or on behalf of the service provider. The host computer 150 may communicate with the wireless device 130 via a third link 160. The third link 160 may comprise one or more wired and wireless links, and extend via, e.g., the cloud 170, the first network node 111, the second network node 112, and other radio network nodes or core network nodes in the wireless communications network 100. In some examples, the third link 160 may extend via an optional intermediate network, which is not depicted in FIG. 2 to simplify the Figure. The intermediate network may be one of, or a combination of more than one of, a public, private or hosted network; the intermediate network may be a backbone network or the Internet. A connectivity provided by the third link 160 may be referred to as an Over the Top (OTT) connection.

The system comprising the host computer 150, and at least one of the first network node 111 and the wireless device 130 may be referred to herein as a telecommunications system 180. Optionally, the telecommunications system 180 may further comprise the second network node 112.

In general, the usage of "first", "second", "third", and/or "fourth" herein may be understood to be an arbitrary way to denote different elements or entities, and may be understood to not confer a cumulative or chronological character to the nouns they modify.

More specifically, the following are: a) embodiments related to a wireless device, such as the wireless device 130, e.g., a UE; and b) embodiments related to a communications system, such as the communications system 180.

Figure 3:
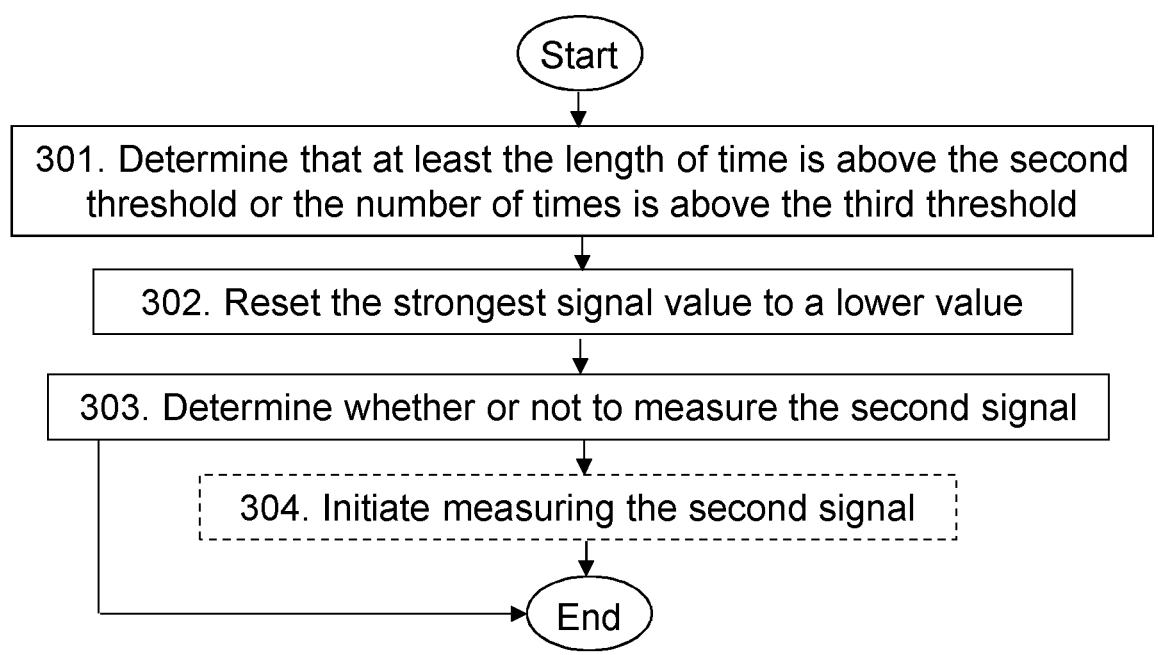
FIG. 3 is a flowchart depicting a method in a wireless device, according to embodiments herein.

Embodiments of a method, performed by the wireless device 130, will now be described with reference to the flowchart depicted in FIG. 3. The method is for handling cell selection and/or cell reselection. The wireless device 130 operates in the wireless communication network 100 having the first cell 121 and the second cell 122. The first cell 121 may be the serving cell 121 and the second cell 122 may be the neighbor cell 122.

The expression "operating in the wireless communication network 100", may be understood as e.g., operating in connection with, or via the wireless communication network 100. In some embodiments, the wireless communications network 100 may operate on at least one of NB-IoT and eMTC.

In some embodiments all the actions may be performed. In some embodiments, an action may be optional. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. In FIG. 3, an optional action is indicated with dashed lines. Some actions may be performed in a different order than that shown in FIG. 3.

Action 301

During the course of operations in the wireless communications network 100, the wireless device 130 may monitor one or more signals, for example, a first signal, from the first cell 121, e.g., the first serving cell 121, to be able to decide if the strength or quality of those one or more signals are good to provide service to the wireless device 130, or if it may be appropriate to look for other cells, e.g., the second cell 122, and move to a different cell which may provide better service, that is a signal having higher strength or better quality. The signals typically used to perform this monitoring may be reference signals, such as Narrowband Reference Signals (NRS) and Cell-Specific Reference Signals (CRS).

Monitoring other cells may be understood to involve usage of processing resources, time resources, and radio resources. As explained earlier, the wireless device 130 may be an NB-IoT device that may be stationary and in deep coverage. In such a case, for example, it may be understood to be unlikely that there may be any suitable neighbor cells that may be capable of providing a better coverage to the wireless device 130. Therefore, to prevent unnecessary usage of processing resources, time resources, and/or radio resources, according to embodiments herein, the wireless device 130 may, prior to initiating the monitoring other cells, check if doing so may be worth it. The wireless device 130 may do this by checking one or more indicators that the wireless device 130 may be stationary, and therefore, that it may not be worthwhile to monitor other cells.

The method herein may be understood to be in the context that the wireless device 130 may have determined that a result of a first measurement of a first signal from the first cell 121, e.g., the serving cell 121, is that the first measurement is below a first threshold. That is, the wireless device 130 may perform any of the actions herein once it may have determined that the strength or quality of the signal provided by its serving cell 121 has fallen below a certain value, e.g., there has been a certain drop in the quality, or strength, of the first signal from the first cell 121. Otherwise, the wireless device 130 may refrain from measuring a second signal from the second cell 122, e.g., the neighbor cell 122.

In this Action 301, the wireless device 130, having determined that the result of the first measurement of the first signal from the first cell 121, e.g., the serving cell 121, is that the first measurement is below the first threshold, determines that at least one of: i) a length of time since the wireless device 130 last performed cell selection or reselection is above a second threshold, and ii) a number of times that neighbor cell measurements failed to trigger cell reselection is above a third threshold. That is, the wireless device 130 may check if i) it has been a long time since the wireless device 130 chose a different cell and/or if ii) in spite of trying to find a better cell, it was unable to find one, after a certain number of attempts. Conditions i) and ii) may be understood as indicators that the wireless device 130 may be stationary. Therefore, if one or both are met, the wireless device 130 may be stationary, and it may be worthless to try to monitor other cells, as without moving the wireless device 130, the coverage is unlikely to have changed.

Determining may be understood as e.g., calculating. In some examples determining may comprise receiving from another node in the wireless communications network 100, e.g., from the first network node 111.

Measurement and signal have been described above. A threshold herein may be understood as a value that may be configured, e.g. by an operator of the wireless communications network 100.

The first measurement may be, for example, a current measurement of the first signal in the first cell 121, e.g., a current measurement of the serving cell 121. Following the terminology of 3GPP TS 45.008, V14.1.0 (2017-06), section 6.6.1a.2 "Monitoring of the serving cell", or that of 3GPP TS 36.304 V13.1.0 (2016-03), sections 5.2.4.2a and 5.2.4.12, a particular non-limiting example of the first measurement may be Srxlev, and of the first threshold may be $S_{SearchP}$. Srxlev may be understood to be another way to refer to $Current_{serving}$. Therefore, to have determined that the result of the first measurement of the first signal from the first cell 121, is that the first measurement is below the first threshold may be for example, that the serving cell 121 fulfills $Current_{serving} < S_{SearchP}$. If the second cell 121 fulfills $Current_{serving} > S_{SearchP}$, the wireless device 130 may choose not to perform intra-frequency measurements and the wireless device 130 may choose not to perform inter-frequency measurements.

To have performed cell selection may be understood herein as having determined that a certain cell is sufficiently good for providing wireless services to the wireless device 130. To have performed cell reselection may be understood herein as determined that a certain cell is able of providing better services than any other cell in the surroundings of the wireless device 130. Upon making the transition from idle to connected mode, the wireless device 130 may use its most recent selected cell for initiating a wireless connection.

The second threshold may be understood to be a time threshold, that is, to refer to a period of time. Following the terminology of 3GPP TS 45.008, V14.1.0 (2017-06), section 6.6.1a.2 "Monitoring of the serving cell", a particular non-limiting example of the second threshold may be $T_{StrongestSrxlev}$.

In some embodiments, neighbor cell measurements may comprise measurements of the second signal from the second cell 122.

To fail to trigger cell reselection may be understood as that at least one criteria that may need to be fulfilled for performing cell reselection is not met.

The third threshold may be understood to be a configurable value.

When a comparison is made herein between a value and a threshold, it will be understood that any of the two references to the value being above or below the threshold may be determined to comprise to be equal to the threshold. This decision may be set arbitrarily. That is, stating herein that e.g., if a value is above a threshold results in a certain result X, and if the value is below or equal to the threshold results in result Y, would be equivalent to performing the method such that if a value is above or equal to the threshold results in a certain result X, and if the value is below the threshold results in result Y.

By performing the determining in this Action 201, the wireless device 130 may be able to determine if it may be worth or not to initiate monitoring of other cells, e.g., the second cell 122, and therefore to avoid wasting resources for performing unnecessary measurements.

Action 302

Typically, measurements of other cells may be triggered by a condition being fulfilled, for example, that the quality or strength of the first signal falls below the first threshold. Having determined that the wireless device 130 is likely stationary and that therefore it may be unlikely that it may be worth it to try to find a better cell, it may be beneficial for the wireless device 130 to avoid that the trigger to initiate the monitoring of other cells such as the second cell 122 is fulfilled. This may be accomplished by the wireless device 130 discarding the condition that may lead to the trigger. Accordingly, in this Action 302, the wireless device 130, resets a strongest signal value of the first signal measured after a last cell selection or reselection by the wireless device 130 to a lower value, based on a first result of the determination of at least one of: the length of time since the wireless device 130 last performed cell selection or reselection is above the second threshold and the number of times that the neighbor cell measurements failed to trigger cell reselection is above the third threshold.

The strongest signal value of the first signal, measured after the last cell selection or reselection by the wireless device 130 may be understood as a first value, and the lower value may be understood as a second value, wherein the second value is lower than the first value, by an amount, e.g., a configurable amount. That the signal value is strongest may be understood as for example, that the signal value has the highest absolute signal strength or power, or the highest absolute signal quality, that is, that it corresponds to the highest signal to noise ratio.

Resetting the strongest signal value of the first signal, measured after the last cell selection or reselection by the wireless device 130 may be understood as discarding the first value, and setting a new value, the second value, in its place. Resetting may be therefore understood as setting a new, or setting again, to e.g., a different value. In some particular examples, the lower value may be a current measurement of the first signal from the first cell 121. A "current" measurement may be understood as the most recent measurement e.g., of a signal power, such as RSRP, that may have been performed on the Narrowband Reference Signal transmitted from the serving base station, that is, the first network node 111.

Following the terminology of 3GPP TS 45.008, V14.1.0 (2017-06), section 6.6.1a.2 "Monitoring of the serving cell", or that of 3GPP TS 36.304 V13.1.0 (2016-03), sections 5.2.4.2a and 5.2.4.12, a particular non-limiting example of the strongest signal value of the first signal, measured after the last cell selection and/or reselection by the wireless device 130, may be $Strongest_{serving}$, and. $Strongest_{serving}$ may also be referred to herein as $Srxlev_{Strongest}$. That is, a strongest RX level value after cell re-selection or cell selection whichever is last. Following the terminology of 3GPP TS 45.008, V14.1.0 (2017-06), section 6.6.1a.2 "Monitoring of the serving cell", a particular non-limiting example of the lower value may be $Current_{serving}$ That is, the current measurement of the first signal from the first cell 121 may be $Current_{serving}$ In some examples, the wireless device 130 may perform the resetting action 302 when, upon, after, and/or based on, determining 301 that the length of time since the wireless device 130 last performed cell selection and/or reselection is above the second threshold. That is, the first result may be that the length of time since the wireless device 130 last performed cell selection and/or reselection is above the second threshold. Otherwise, the wireless device 130 may refrain from resetting the strongest signal value of the first signal measured after the last cell selection or reselection to the lower value.

A particular example of this may be that the wireless device 130 may set $Strongest_{serving}$ to the current received signal, RX, level value, e.g., the $Current_{serving}$, when the wireless device 130 has not performed cell re-selection for $T_{StrongestSrxlev}$ hours.

In some examples, the wireless device 130 may perform the resetting action 302 when, upon, after, and/or based on, determining 301 that the number of times that neighbor cell measurements failed to trigger cell reselection is above the third threshold. That is, the first result may be that the number of times that neighbor cell measurements failed to trigger cell reselection is above the third threshold. Otherwise, the wireless device 130 may refrain from resetting the strongest signal value of the first signal measured after the last cell selection or reselection to the lower value.

By resetting the strongest signal value of the first signal measured after the last cell selection or reselection by the wireless device 130 to the lower value, the wireless device 130, when e.g., being stationary UE at the cell border, may refrain to continue to perform neighbor measurements in the hope to find a better neighbor cell after some time, and may thus save power, as well as radio and processing resources.

Action 303

After having reset the strongest signal value, the wireless device 130 may decide, e.g., after a certain period of time, to check again if there may have been a new drop in quality of the first cell 121 that may trigger monitoring of other cells, such as the second cell 122. In this Action 303, the wireless device 130 determines whether or not to measure a second signal from the second cell 122, based on whether or not a difference between: a) the reset strongest signal value of the first signal measured after the last cell selection or reselection by the wireless device 130 and b) the current measurement of the first signal from the first cell 121, is above a fourth threshold. That is, the wireless device 130 may determine to measure the second signal from the second cell 122 only when the difference between a) the reset strongest signal value of the first signal measured after the last cell selection or reselection by the wireless device 130 and b) the current measurement of the first signal from the first cell 121, is above the fourth threshold, but not otherwise. In other words, the wireless device 130 may determine to measure the second signal from the second cell 122 only when there is a sufficiently big drop in the quality of the first signal.

The second signal may be understood to be equivalent to the same signal, e.g., a Narrowband Reference Signal (NRS), a Cell-Specific Reference Signals (CRS), etc. . . . , only that the second signal is transmitted by the second network node 112 in the second cell 122.

Following the terminology of 3GPP TS 45.008, V14.1.0 (2017-06), section 6.6.1a.2 "Monitoring of the serving cell", a particular non-limiting example of the current measurement of the first signal from the serving cell 121 may be $Current_{serving}$ and of the fourth threshold may be $Delta_{SI}$. Therefore, a particular example of Action 303 may be that the wireless device 130 may determine if $Strongest_{serving}-Current_{serving}>Delta_{SI}$.

By the wireless device 130 performing the determination in this Action 303, the wireless device 130 may check if the reset condition in Action 302 is fulfilled or not, in order to trigger the initiation of measurements of other cells, such as the second cell 122.

Action 304

In this Action 304, the wireless device 130 may then initiate measuring, e.g., measure, the second signal based on a second result of the determination of whether or not to measure, as performed in Action 303. That is, the wireless device 130 may only initiate the measuring when the second result of the determination is that the wireless device 130 is to measure the second signal. Otherwise, the wireless device 130 may refrain from initiating to measure the second signal.

To initiate measuring may be understood as to trigger the measuring, starting the measuring, or performing the measuring.

In some embodiments, the wireless device 130 may further send a measurement report to the first network node 111 based on a result measuring the second signal in Action 304.

By measuring the second signal based on the result of the determination of whether or not to measure in in this Action 201, the wireless device 130 is enabled to only initiate performing the measuring of the second signal, when it may be worth to initiate monitoring other cells, e.g., the second cell 122. Therefore, the wireless device 130 is enabled to avoid wasting resources performing unnecessary measurements, when a probability of finding a cell providing better coverage is very low.

Figure 7:
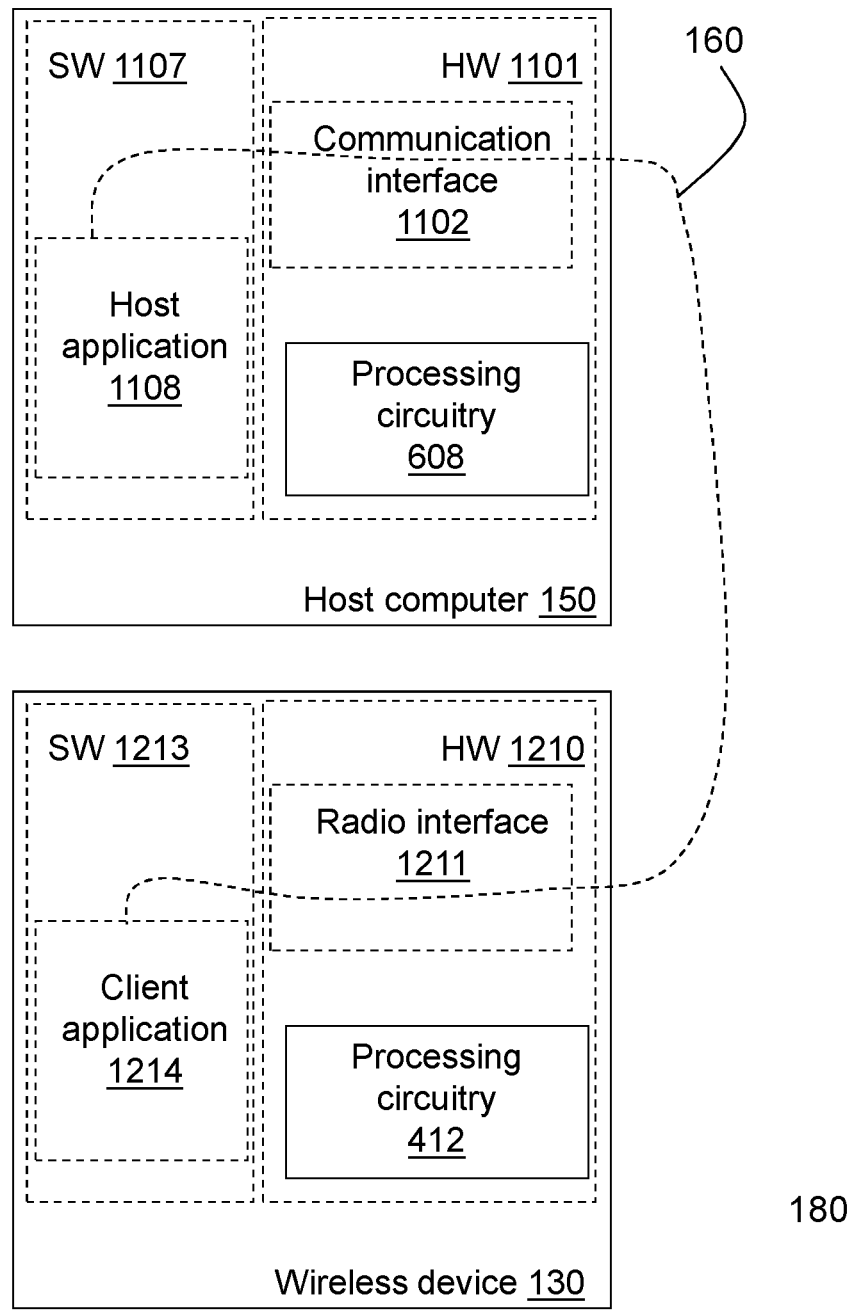
FIG. 7 is a schematic block diagram illustrating embodiments of a telecommunications system, according to embodiments herein.

It may be understood that the Actions described above in relation to FIG. 3, and correspondingly to FIG. 7, may be repeated every time after another cell selection/cell reselection.

The method herein may be performed when the wireless device 130 may be configured with relaxed monitoring by upper layers.

Embodiments herein will now be described with some non-limiting examples. In the following description any reference to a/the UE may be understood to relate to the wireless device 130, and any reference to a/the network node may be understood to relate to the first network node 111.

To dynamically detect when the UE is mobile and when the UE is stationary the UE may apply the following rules.

If the UE is configured with relaxed monitoring by upper layers, the following rules may be used by the UE to limit needed measurements:

If the serving cell 121 fulfills Current$_{serving}$>S$_{SearchP}$, the UE may choose not to perform intra-frequency measurements and the UE may choose not to perform inter-frequency measurements.

Otherwise:
If, as determined in Action 303, Strongest$_{serving}$–Current$_{Serving}$>Delta$_{SI}$, or, as determined in Action 301, the UE has not performed neighbour cell measurements for T$_{MinNeighbourMeasure}$ hours:
The UE may, in Action 304, perform intra-frequency measurements, as determined in Action 303; e.g., the UE may be required to perform intra-frequency measurements.
If cell reselection as defined in sub-clause 5.2.4.6 is not triggered, the UE may perform inter-frequency measurements for NB-IoT inter-frequencies which may be indicated in system information; e.g., the UE may be required to perform inter-frequency measurements for the NB-IoT inter-frequencies.

Where:
Srxlev$_{Strongest}$=strongest RX level value after cell re-selection or cell selection whichever is last The UE may set Strongest$_{serving}$ to the current RX level value (Current$_{serving}$) when the UE has not performed cell re-selection for T$_{StrongestSrxlev}$ hours.

One advantage of embodiments herein is that e.g., a stationary UE at the cell border, does not continue to perform neighbor measurements in the hope to find a better neighbor cell after some time, and thus saves power, radio resources, and processing resources.

Figure 4:
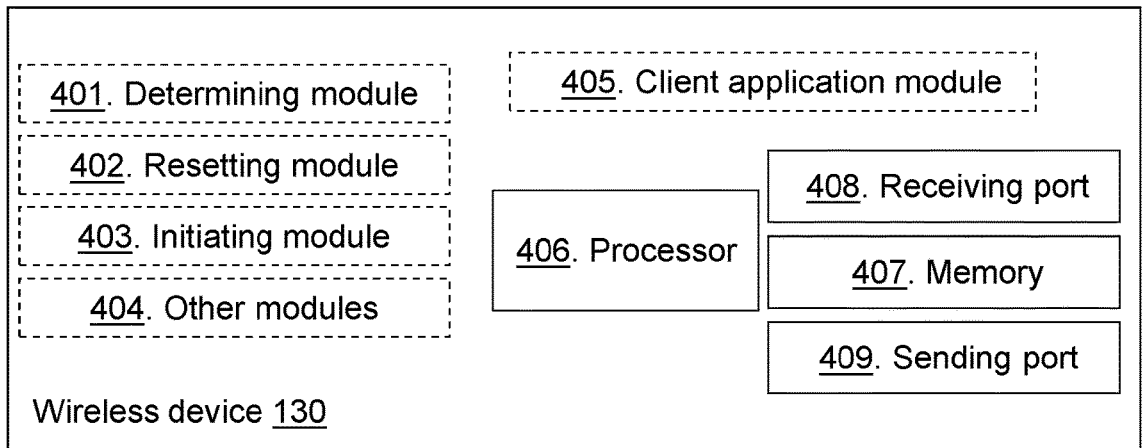
FIG. 4 is a schematic block diagram illustrating embodiments of a wireless device, according to embodiments herein.
Figure 4:
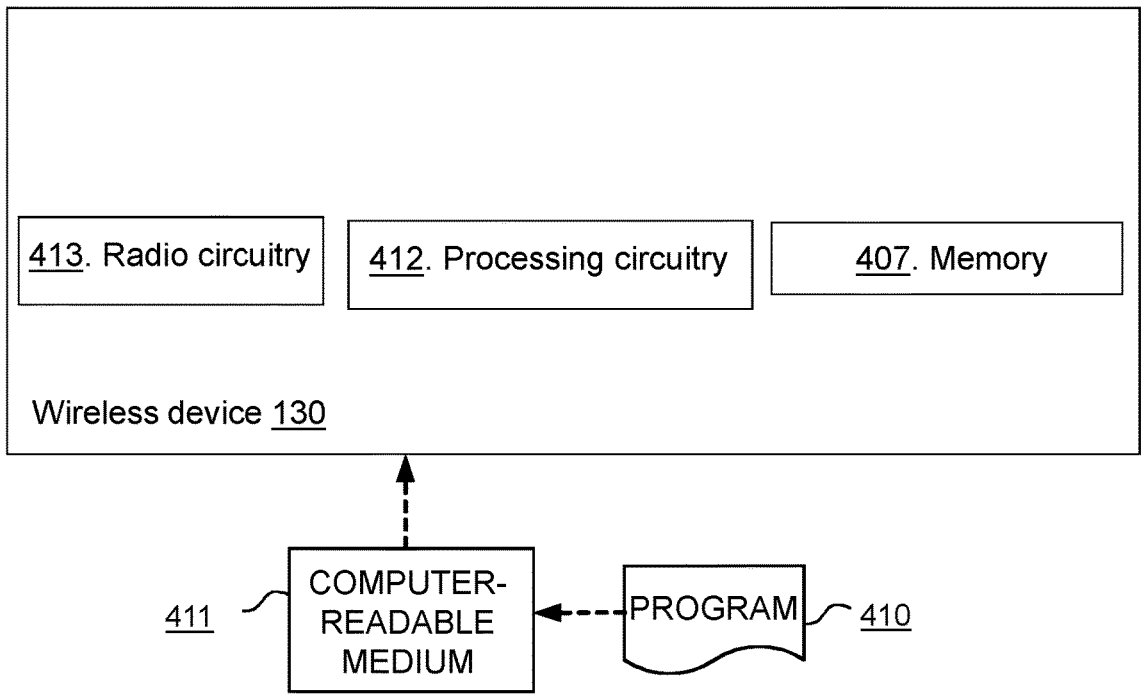

FIG. 4 depicts two different examples in panels a) and b), respectively, of the arrangement that the wireless device 130 may comprise to perform the method actions described above in relation to FIG. 3. In some embodiments, the wireless device 130 may comprise any of the following arrangement depicted in FIG. 4a. The wireless device 130 is configured to handle cell selection and/or reselection. The wireless device 130 is further configured to operate in the wireless communications network 100. The wireless communications network 100 is configured to have the first cell 121 and the second cell 122. In some embodiments, the first cell 121 may be configured to be the serving cell 121 and the second cell 122 may be configured to be the neighbor cell 122.

In FIG. 4, optional modules are indicated with dashed boxes.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130, and will thus not be repeated here. For example, the wireless communications network 100 may operate on at least one of: NB-IoT and eMTC.

The wireless device 130 is further configured to perform the determining action 301, having determined that the result of the first measurement of the first signal from the first cell 121 is that the first measurement is below the first threshold, e.g. by means of a determining module 401 within the wireless device 130, configured to, determine that at least one of: i) the length of time since the wireless device 130 last performed cell selection or reselection is above the second threshold, and ii) the number of times that neighbor cell measurements failed to trigger cell reselection is above the third threshold. The determining module 401 may be a processor 406 of the wireless device 130, or an application running on such processor.

The wireless device 130 is further configured to configured to perform the resetting 302 action, e.g. by means of a resetting module 402 within the wireless device 130 configured to, reset the strongest signal value of the first signal measured after the last cell selection or reselection by the wireless device 130, to the lower value based on the first result of the determination of the at least one of: the length of time and the number of times. The resetting module 402 may be the processor 406 of the wireless device 130, or an application running on such processor.

In some embodiments, the lower value may be the current measurement of the first signal from the first cell 121.

The wireless device 130 is further configured to perform the determining action 303, e.g. by means of the determining module 401 within the wireless device 130, configured to, determine whether or not to measure the second signal from the second cell 122, based on whether or not the difference between: a) the strongest signal value of the first signal measured after the last cell selection or reselection by the wireless device 130, configured to be reset, and b) the current measurement of the first signal from the first cell 121, is above the fourth threshold.

The wireless device 130 is further configured to perform the initiating measuring action 304, e.g. by means of an initiating module 403 within the wireless device 130 configured to, initiate to measure the second signal based on the second result of the determination of whether or not to measure. The initiating module 403 may be the processor 406 of the wireless device 130, or an application running on such processor.

In some embodiments, i. the first measurement of the first signal may be configured to be Srxlev, ii. the first threshold may be configured to be S$_{SearchP}$, iii. the strongest signal value of the first signal measured after the last cell selection or reselection by the wireless device 130 may be configured to be Strongest$_{serving}$, iv. the current measurement of the first signal from the first cell 121 may be configured to be Current$_{serving}$, v. the second threshold may be configured to be T$_{StrongestSrxlev}$; and vi. the fourth threshold may be configured to be Delta$_{Sf}$.

Other modules 404 may be comprised in the wireless device 130.

In other embodiments, as will be discussed later in relation to FIG. 7, the wireless device 130 may comprise a client application 1214, which may be configured to communicate user data with a host application 1108 in the host computer 150, e.g., via the third link 160.

The wireless device 130 may also comprise a client application module 505, which may be configured to communicate user data with a host application module 1501 in the host computer 150, e.g., via the third link 160.

The embodiments herein in the wireless device 130 may be implemented through one or more processors, such as a processor 406 in the wireless device 130 depicted in FIG. 4a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 407 comprising one or more memory units. The memory 407 is arranged to be used to store obtained information, store data, configurations, schedulings, and applications etc. to perform the methods herein when being executed in the wireless device 130.

In some embodiments, the wireless device 130 may receive information from, e.g., any of the first network node 111, the second network node 112, and the host computer 150, through a receiving port 408. In some embodiments, the receiving port 408 may be, for example, connected to one or more antennas in wireless device 130. In other embodiments, the wireless device 130 may receive information from another structure in the wireless communications network 100 through the receiving port 408. Since the receiving port 408 may be in communication with the processor 406, the receiving port 408 may then send the received information to the processor 406. The receiving port 408 may also be configured to receive other information.

The processor 406 in the wireless device 130 may be further configured to transmit or send information to e.g., any of the first network node 111, the second network node 112, and the host computer 150, or another structure in the wireless communications network 100, through a sending port 409, which may be in communication with the processor 406, and the memory 407.

Those skilled in the art will also appreciate that the determining module 401, the resetting module 402, the initiating, or measuring, module 403, the other modules 404 and the client application module 405 described above may refer to a combination of analog and digital modules, and/or one or more processors configured with software and/or firmware, e.g., stored in memory, that, when executed by the one or more processors such as the processor 406, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 401-405 described above may be implemented as one or more applications running on one or more processors such as the processor 406.

Thus, the methods according to the embodiments described herein for the wireless device 130 may be respectively implemented by means of a computer program 410 product, comprising instructions, i.e., software code portions, which, when executed on at least one processor 406, cause the at least one processor 406 to carry out the actions described herein, as performed by the wireless device 130. The computer program 410 product may be stored on a computer-readable storage medium 411. The computer-readable storage medium 411, having stored thereon the computer program 410, may comprise instructions which, when executed on at least one processor 406, cause the at least one processor 406 to carry out the actions described herein, as performed by the wireless device 130. In some embodiments, the computer-readable storage medium 411 may be a non-transitory computer-readable storage medium, such as a CD ROM disc, or a memory stick. In other embodiments, the computer program 410 product may be stored on a carrier containing the computer program 410 just described, wherein the carrier is one of an electronic signal, optical signal, radio signal, or the computer-readable storage medium 411, as described above.

The wireless device 130 may comprise an interface unit or a communication interface configured to facilitate communications between the wireless device 130 and other nodes or devices, e.g., any of the first network node 111, the second network node 112, and the host computer 150, or any other nodes or devices. In some particular examples, the interface may, for example, include a transceiver configured to transmit and receive radio signals over an air interface in accordance with a suitable standard.

In other embodiments, the wireless device 130 may comprise the following arrangement depicted in FIG. 4b. The wireless device 130 may comprise a processing circuitry 412, e.g., one or more processors such as the processor 406, in the wireless device 130 and the memory 407. The wireless device 130 may also comprise a radio circuitry 413, which may comprise e.g., the receiving port 408 and the sending port 409. The processing circuitry 413 may be configured to, or operable to, perform the method actions according to FIG. 3, in a similar manner as that described in relation to FIG. 4a. The radio circuitry 413 may be configured to set up and maintain at least a wireless connection with any of the first network node 111, the second network node 112, and the host computer 150. Circuitry may be understood herein as a hardware component.

Hence, embodiments herein also relate to the wireless device 130 operative to handle cell selection and/or reselection by the wireless device 130, the wireless device 130 being operative to operate in the wireless communications network 100. The wireless device 130 may comprise the processing circuitry 412 and the memory 407, said memory 407 containing instructions executable by said processing circuitry 412, whereby the wireless device 130 is further operative to perform the actions described herein in relation to the wireless device 130, e.g., in FIG. 3.

In other related examples, one or more actions of the method described below in may be performed.

RELATED EXAMPLES

A first related example is a method, performed by a wireless device (130), for handling cell selection and/or reselection, the wireless device (130) having a serving cell (121) and a neighbor cell (122), the wireless device (130) operating in a wireless communications network (100), the method comprising:
  determining (301) that at least one of:
    i. a length of time since the wireless device (130) last performed cell selection and/or reselection is above a second threshold, and
    ii. a number of times that neighbor cell measurements failed to trigger cell reselection is above a third threshold,
  resetting (302) a strongest signal value of a first signal from the serving cell (121), measured after a last cell selection and/or reselection by the wireless device (130), to a lower value based on a first result of the determination of at least one of: the length of time and the number of times,
  determining (303) whether or not to measure a second signal from the neighbor cell (122), based on whether or not a difference between: a) the reset strongest signal value of the first signal measured after a last cell selection and/or reselection by the wireless device (130) and b) a current measurement of the first signal from the serving cell (121), is above a fourth threshold, and
  initiating (303) measuring the second signal based on a second result of the determination of whether or not to measure.

A second related example is the method according to related example 1, the method further comprising, prior to initiating the method, having determined that a result of a first measurement of the first signal is that the first measurement is below a first threshold.

A third related example is the method according to any of related examples 1-2, wherein the lower value is the current measurement of the first signal from the serving cell (121).

A fourth related example is the method according to any of related examples 1-3, wherein: i) the first measurement of the first signal is Srxlev; ii) the first threshold is $S_{SearchP}$; iii) the strongest signal value of the first signal measured after the last cell selection and/or reselection by the wireless device (130) is $Strongest_{serving}$; iv) the current measurement of the first signal from the serving cell (121) is $Current_{serving}$; v) the second threshold is $T_{StrongestSrxlev}$; and vi) the fourth threshold is $Delta_{SI}$.

Further Extensions and Variations

Figure 5:
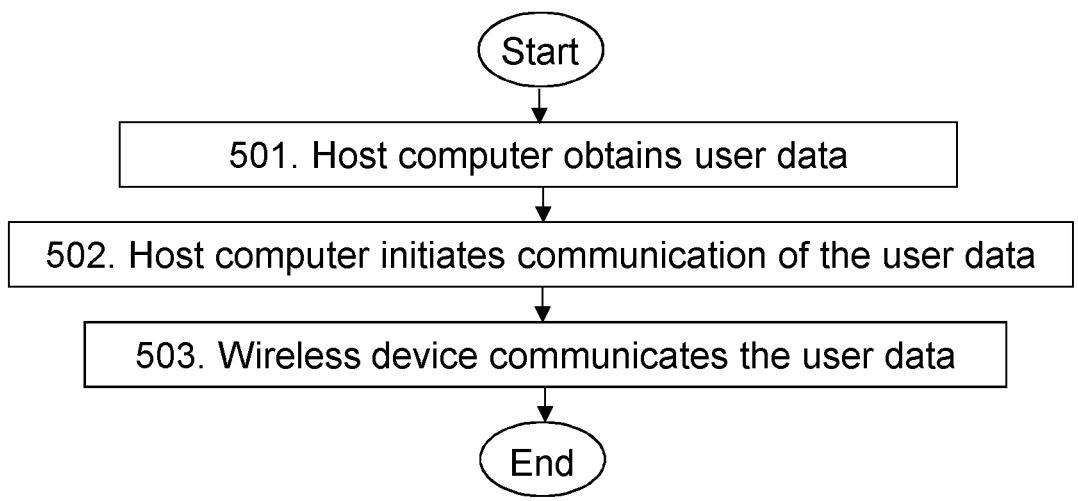
FIG. 5 is a flowchart depicting a method in a telecommunications system, according to embodiments herein.

Embodiments of a method, performed by the communications system 180, will now be described with reference to the flowchart depicted in FIG. 5. The method is for handling cell selection and/or cell reselection. The communications system 180 may comprise the wireless device 130 and the host computer 150. The communications system 180 may also comprise the first network node 111, and/or the second network node 112. The wireless communication network 100 has the first cell 121 and the second cell 122. The first cell 121 may be the serving cell 121 and the second cell 122 may be the neighbor cell 122.

The detailed description of some of the following corresponds to the same references provided above, in relation to the actions described for the wireless device 130, and will thus not be repeated here. For example, the wireless communications network 100 may operate on at least one of: NB-IoT and eMTC.

The method performed by the communications system 180 may comprise one or more of the following actions. In some embodiments all the actions may be performed. In some embodiments, one or more actions may be performed. It should be noted that the examples herein are not mutually exclusive Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 5. For example, since communication may be any of reception of transmission, the actions may be performed in the opposite order than that depicted in FIG. 5.

Action 501

In this Action 501, the communications system 180 may obtain, at the host computer 150, user data for a user of the wireless device 130.

Action 502

In this Action 502, the communications system 180 may initiate communication, at the host computer 150, of the user data to or from the wireless device 130.

Action 503

In some embodiments, the method may further comprise the action 503, of communicating, at the wireless device 130, the user data to or from the host computer 150. The wireless device 130 may further perform the Action 301 of determining that at least one of: i. the length of time since the wireless device 130 last performed cell selection and/or reselection is above the second threshold, and ii. the number of times that neighbor cell measurements failed to trigger cell reselection is above the third threshold. The wireless device 130 may further perform the Action 302 of resetting the strongest signal value of the first signal, measured after the last cell selection and/or reselection by the wireless device 130, to the lower value based on the first result of the determination of at least one of: the length of time and the number of times. The wireless device 130 may further perform the Action 303 of determining whether or not to measure the second signal from the neighbor cell 122, based on whether or not the difference between: a) the reset strongest signal value of the first signal measured after the last cell selection and/or reselection by the wireless device 130 and b) the current measurement of the first signal from the serving cell 121, is above the fourth threshold. The wireless device 130 may further perform the Action 304 of initiating measuring the second signal based on the second result of the determination of whether or not to measure.

In some embodiments, prior to performing Actions 301-304, the wireless device 130 may have determined that a result of a first measurement of a first signal from the serving cell 121 is that the first measurement is below the first threshold.

Communicating may mean herein any of receiving or transmitting. Similarly, communication may be transmission or reception. It may be understood that if the host computer 150 initiates communication, wherein communication is transmission, the communicating 503 at the wireless device 130 may comprise receiving from the host computer 150. Likewise, it may be understood that if the host computer 150 initiates communication, wherein communication is reception, the communicating 503 at the wireless device 130 may comprise transmitting to the host computer 150.

The method herein may be performed when, in the communications system 180, the wireless device 130 may be configured with relaxed monitoring by upper layers.

To perform the method actions described above in relation to FIG. 5, the communications system 180 may be configured to comprise the wireless device 230 and the host computer 150. The communications system 180 may also be understood to comprise the first network node 111.

The communications system 180 may be configured to obtain, at the host computer 150, the user data for the user of the wireless device 130. The communications system 180 may be further configured to initiate communication, at the host computer 150, of the user data to or from the wireless device 130.

Figure 6:
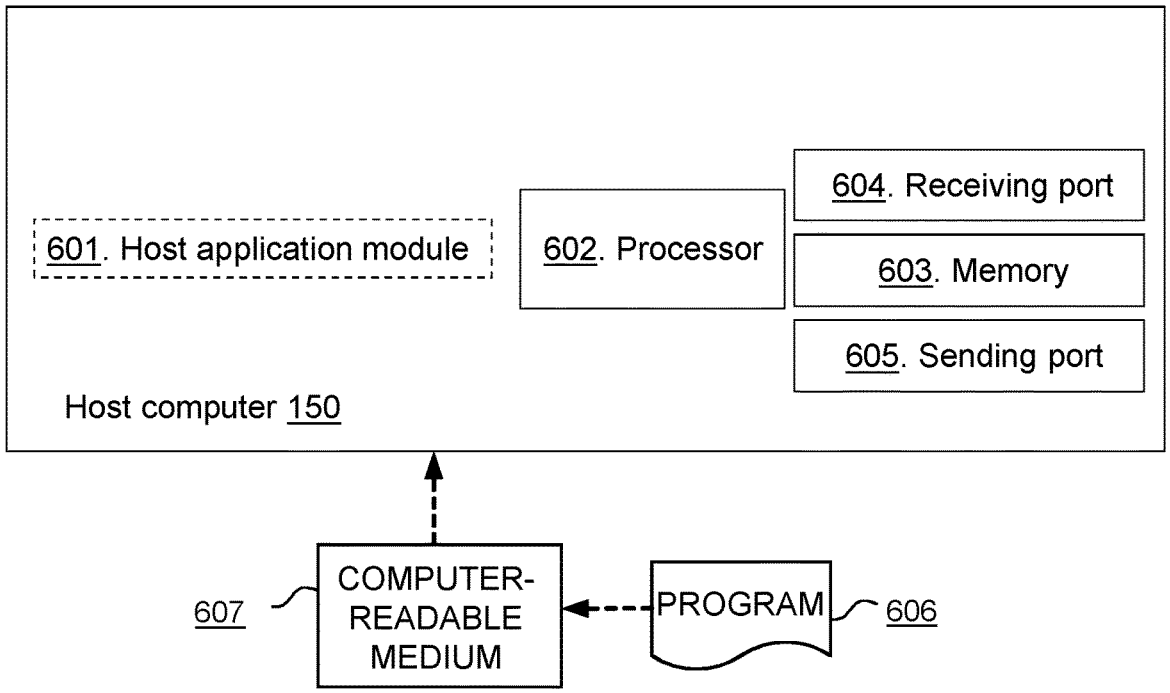
FIG. 6 is a schematic block diagram illustrating embodiments of a host computer, according to embodiments herein.
Figure 6:
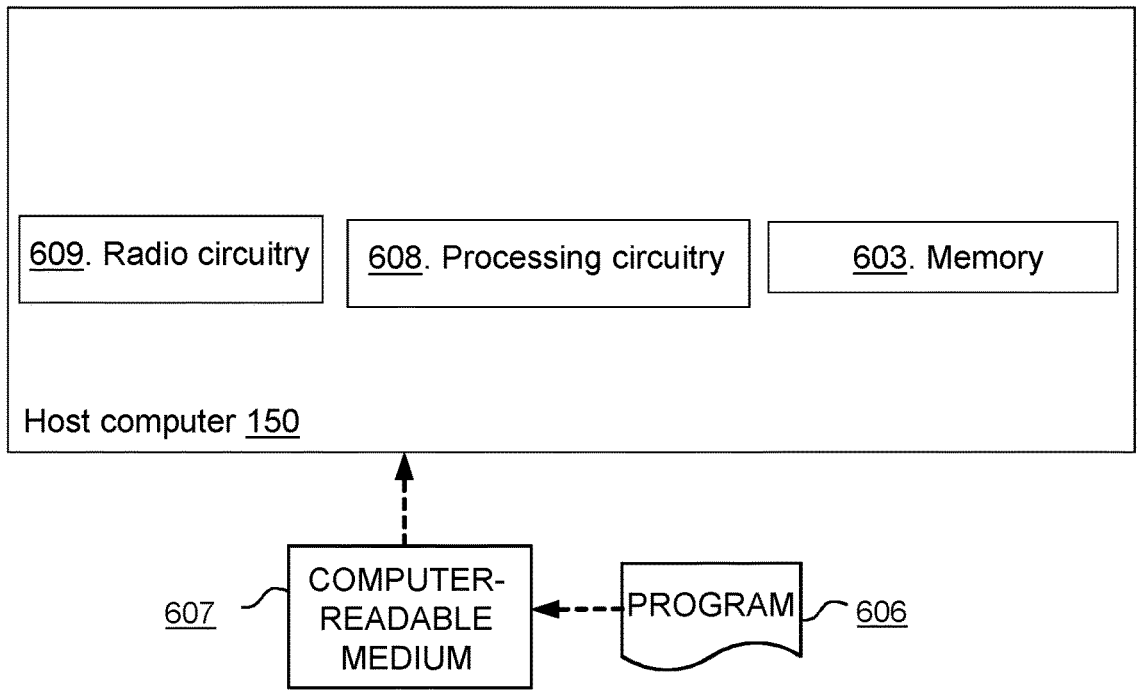

FIG. 6 depicts two different examples in panels a) and b), respectively, of the arrangement that the host computer 150 may comprise, to perform the method actions described above in relation to FIG. 5. In some embodiments, the host computer 150 may comprise the following arrangement depicted in FIG. 6a.

The detailed description of some of the following corresponds to the same references provided above, in relation to the actions described for the wireless device 130, and will thus not be repeated here.

The host computer 150 may be configured to, e.g. by means of a host application module 601 within the host computer 150 configured to, obtain, at the host computer 150, the user data for the user of the wireless device 130. The host application module 601 may be a processor 602 of the host computer 150, or an application running on such processor.

The host computer 150 may be configured to, e.g. by means of the host application module 601 within the host computer 150 configured to, initiate communication, at the host computer 150, of the user data to or from the wireless device 130. The host application module 601 may be a processor 602 of the host computer 150, or an application running on such processor.

The embodiments herein in the host computer 150 may be implemented through one or more processors, such as a processor 602 in the host computer 150 depicted in FIG. 6a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the in the host computer 150. One such carrier may be in the form of a CD ROM disc. It is however feasible with other data carriers such as a memory stick. The computer program code may furthermore be provided as pure program code on a server and downloaded to the host computer 150.

The host computer 150 may further comprise a memory 603 comprising one or more memory units. The memory 603 is arranged to be used to store obtained information, store data, configurations, schedulings, and applications etc. to perform the methods herein when being executed in the host computer 150.

In some embodiments, the host computer 150 may receive information from, e.g., any of the first network node 111, the second network node 112, and the wireless device 130, through a receiving port 604. In some embodiments, the receiving port 604 may be, for example, connected to one or more antennas in host computer 150. In other embodiments, the host computer 150 may receive information from another structure in the telecommunications system 180, e.g., in the wireless communications network 100, through the receiving port 604. Since the receiving port 604 may be in communication with the processor 602, the receiving port 604 may then send the received information to the processor 602. The receiving port 604 may also be configured to receive other information.

The processor 602 in the host computer 150 may be further configured to transmit or send information to e.g., any of the first network node 111, the second network node 112, the wireless device 130, and/or another structure in the telecommunications system 180, e.g., in the wireless communications network 100, through a sending port 605, which may be in communication with the processor 602, and the memory 603.

Those skilled in the art will also appreciate that the host application module 601 described above may refer to a combination of analog and digital modules, and/or one or more processors configured with software and/or firmware, e.g., stored in memory, that, when executed by the one or more processors such as the processor 602, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application module 601 described above may be implemented as one or more applications running on one or more processors such as the processor 602.

Thus, the methods according to the embodiments described herein for the host computer 150 may be respectively implemented by means of a computer program 606 product, comprising instructions, i.e., software code portions, which, when executed on at least one processor 602, cause the at least one processor 602 to carry out the actions described herein, as performed by the host computer 150. The computer program 606 product may be stored on a computer-readable storage medium 607. The computer-readable storage medium 607, having stored thereon the computer program 606, may comprise instructions which, when executed on at least one processor 602, cause the at least one processor 602 to carry out the actions described herein, as performed by the host computer 150. In some embodiments, the computer-readable storage medium 607 may be a non-transitory computer-readable storage medium, such as a CD ROM disc, or a memory stick. In other embodiments, the computer program 606 product may be stored on a carrier containing the computer program 606 just described, wherein the carrier is one of an electronic signal, optical signal, radio signal, or the computer-readable storage medium 607, as described above.

The host computer 150 may comprise an interface unit, or a communication interface configured to facilitate communications between the host computer 150 and other nodes or devices, e.g., any of the first network node 111, the second network node 112, and the wireless device 130, or any of the other nodes or devices in the wireless communications network 100. In some particular examples, the interface may, for example, include a transceiver configured to transmit and receive radio signals over an air interface in accordance with a suitable standard.

In other embodiments, the host computer 150 may comprise the following arrangement depicted in FIG. 6b. The host computer 150 may comprise a processing circuitry 608, e.g., one or more processors such as the processor 602, in the host computer 150 and the memory 603. The host computer 150 may also comprise a radio circuitry 609, which may comprise e.g., the receiving port 604 and the sending port 605. The processing circuitry 608 may be configured to perform the method actions according to FIG. 5, in a similar manner as that described in relation to FIG. 6*a*. The radio circuitry 609 may be configured to set up and maintain at least a wireless connection with any of the first network node 111, the second network node 112, and the wireless device 130. Circuitry may be understood herein as a hardware component.

Hence, embodiments herein also relate to the host computer 150 operative to handle cell selection and/or reselection by the host computer 150, the host computer 150 being operative to operate in the wireless communications network 100. The host computer 150 may comprise the processing circuitry 608 and the memory 603, said memory 603 containing instructions executable by said processing circuitry 608, whereby the host computer 150 is further operative to perform the actions described herein in relation to the host computer 150, e.g., in FIG. 5.

Example implementations, in accordance with an embodiment, of the wireless device 130, and host computer 150 discussed in the preceding paragraphs will now be described with reference to FIG. 7. The wireless device 130 may comprise an arrangement as shown in FIG. 4 or in FIG. 7. The host computer 150 may comprise an arrangement as shown in FIG. 6 or in FIG. 7. According to this example implementation, in the telecommunications system 180, the host computer 150 comprises HardWare (HW) 1101 including a communication interface 1102 configured to set up and maintain a wired or wireless connection with an interface of a different communication device of the telecommunications system 180. The communication interface 1102 may comprise the receiving port 604 and the sending port 605, as described above. The host computer 150 further comprises the processing circuitry 608, which may have storage and/or processing capabilities. In particular, the processing circuitry 608 may comprise one or more programmable processors, application-specific integrated circuits, field programmable gate arrays or combinations of these, not shown, adapted to execute instructions. The embodiments herein as performed by the host computer 150 may be implemented through one or more processors, such as the processing circuitry 608 in the host computer 150 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the host computer 150. One such carrier may be in the form of a CD ROM disc. It is however feasible with other data carriers such as a memory stick. The computer program code may furthermore be provided as pure program code on a server and downloaded to the host computer 150.

The hardware 1101 of the host computer 150 may further comprise the memory 603, which is not depicted in FIG. 7 to simplify the Figure.

The host computer 150 in the example of FIG. 7 further comprises a SoftWare (SW) 1107, which is stored in or accessible by the host computer 150 and executable by the processing circuitry 608. The software 1107 includes a host application 1108. The host application 1108 may be operable to provide a service to a remote user, such as the wireless device 130, connecting via the third link 160, e.g., an OTT connection, terminating at the wireless device 130 and the host computer 150. In providing the service to the remote user, the host application 1108 may provide user data which is communicated using the third link 160, e.g., the OTT connection. The host application 1108 may be understood to be configured to or operative to perform any of the actions described earlier as performed by the host application module 601.

The processing circuit 608 may be configured to provide the user data for a user of the wireless device 130. In some embodiments, the processing circuit 608 of the host computer 150 may be configured to execute the host application 1108, thereby providing the user data.

The processing circuit 608 may be further configured to initiate the communication carrying the user data to the wireless device 130.

The communication interface 1102 may be configured to communicate the user data to the wireless communications network 100 comprising the wireless device 130.

Those skilled in the art will also appreciate that the host application 1108 described above, in some other examples, may refer to a combination of analog and digital modules, and/or one or more processors configured with software and/or firmware, e.g., stored in memory, that, when executed by the one or more processors such as the processing circuitry 608, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application 1108 described above may be implemented as one or more applications running on one or more processors such as the processing circuitry 608.

The telecommunication system 180 may further include the wireless device 130, which may comprise the following example arrangement depicted in FIG. 7. The wireless device 130, in the example of FIG. 7, comprises a hardware 1210 which may include a radio interface 1211 configured to set up and maintain the first link 141, e.g., a wireless connection, with the first network node 111, serving a coverage area in which the wireless device 130 is currently located, as a part of the third link 160, which is not depicted in FIG. 7 to simplify the Figure. The hardware 1210 of the wireless device 130 further includes the processing circuitry 412, which may comprise one or more programmable processors, application-specific integrated circuits, field programmable gate arrays or combinations of these (not shown) adapted to execute instructions. The wireless device 130, in the example of FIG. 7, may further comprise software 1213, which is stored in or accessible by the wireless device 130 and executable by the processing circuitry 412. The software 1213 may include a client application 1214. The client application 1214 may be operable to provide a service to a human or non-human user via the wireless device 130, with the support of the host computer 150. In the host computer 150, an executing host application 1108 may communicate with the executing client application 1214 via the third link 160, e.g., an OTT connection, terminating at the wireless device 130, and the host computer 150. In providing the service to the user, the client application 1214 may receive request data from the host application 1108 and provide user data in response to the request data. The third link 160 may transfer both the request data and the user data. The client application 1214 may interact with the user to generate the user data that it provides. The client application 1214 may be understood to be configured to or operative to perform any of the actions described earlier as performed by the client application module 405.

The inner workings of the wireless device 130, and the host computer 150 may be as shown in FIG. 7, or as in any of FIG. 4 and FIG. 6, respectively, and independently, the surrounding network topology may be that of FIG. 2.

In FIG. 7, the third link 160, which is in this FIG. 7 an OTT connection, has been drawn schematically to illustrate the communication between the host computer 150 and the wireless device 130, which may be e.g., via the first network node 111, or the second network node 112, without explicit reference to any intermediary devices and the precise routing of messages via these devices. Network infrastructure may determine the routing, which it may be configured to hide from the wireless device 130 or from the service provider operating the host computer 150, or both. While the OTT connection is active, the network infrastructure may further take decisions by which it dynamically changes the routing, e.g., on the basis of load balancing consideration or reconfiguration of the network.

The third link 160 between the wireless device 130, and the host computer 150, and/or any of the first network node 111 and the second network node 112, as the case may be, is in accordance with the teachings of the embodiments described throughout this disclosure. One or more of the various embodiments improve the performance of OTT services provided to the wireless device 130 using the OTT connection of the third link 160, in which the wireless connection of the first link 141 may form the last segment.

It may be understood that the wireless device 130 in the telecommunications system 180 may comprise any of the arrangements described in FIG. 4 or 7. Similarly, the host computer 150 in the telecommunications system 180 may comprise any of the arrangements described in FIG. 6 or 7.

Embodiments herein may relate to: LTE, LTE-M, eMTC, NB-IoT, reduced UE power consumption, cell selection, cell re-selection, neighbor cell measurements, intra-frequency measurements, inter-frequency measurements, measurement rules, idle mode measurements.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method, performed by a wireless device, for handling cell selection and/or reselection, the wireless device operating in a wireless communications network having a first cell and a second cell, the method comprising, having determined that a result of a first measurement of a first signal from the first cell is that the first measurement is below a first threshold:
   determining that at least one of:
      a length of time since the wireless device last performed cell selection or reselection is above a second threshold, and
      a number of times that neighbor cell measurements failed to trigger cell reselection is above a third threshold,
   resetting a strongest signal value of the first signal measured after a last cell selection or reselection by the wireless device, to a lower value based on a first result of the determination of at least one of: the length of time and the number of times,
   determining whether or not to measure a second signal from the second cell, based on whether or not a difference between: a) the reset strongest signal value of the first signal measured after the last cell selection or reselection by the wireless device and b) a current measurement of the first signal from the first cell, is above a fourth threshold, and
   initiate measuring the second signal based on a second result of the determination of whether or not to measure.

2. The method according to claim 1, wherein the first cell is a serving cell and the second cell is a neighbor cell.

3. The method according to claim 2, wherein the lower value is the current measurement of the first signal from the first cell.

4. The method according to claim 1, wherein:
   the first measurement of the first signal is Srxlev;
   the first threshold is $S_{SearchP}$;
   the strongest signal value of the first signal measured after the last cell selection or reselection by the wireless device is $Strongest_{serving}$;
   the current measurement of the first signal from the first cell is $Current_{serving}$;
   the second threshold is $T_{StrongestSrxlev}$; and
   the fourth threshold is $Delta_{SI}$.

5. The method according to claim 1, wherein the wireless communications network operates on at least one of: Narrow Band-Internet of Things, NB-IoT, and enhanced Machine Type Communication, eMTC.

6. A wireless device configured to handle cell selection and/or reselection, the wireless device being further configured to operate in a wireless communications network configured to have a first cell and a second cell, the wireless device comprising:
   radio circuitry; and
   processing circuitry configured to, having determined that a result of a first measurement of a first signal from the first cell is that the first measurement is below a first threshold,
      determine that at least one of:
         a length of time since the wireless device last performed cell selection or reselection is above a second threshold, and
         a number of times that neighbor cell measurements failed to trigger cell reselection is above a third threshold,
      reset a strongest signal value of the first signal measured after a last cell selection or reselection by the wireless device, to a lower value based on a first result of the determination of at least one of: the length of time and the number of times,
      determine whether or not to measure a second signal from the second cell, based on whether or not a difference between: a) the strongest signal value of the first signal measured after the last cell selection or reselection by the wireless device, configured to be reset, and b) a current measurement of the first signal from the first cell, is above a fourth threshold, and
      initiate to measure the second signal based on a second result of the determination of whether or not to measure.

7. The wireless device according to claim 6, wherein the first cell is configured to be a serving cell and the second cell is configured to be a neighbor cell.

8. The wireless device according to claim 7, wherein the lower value is the current measurement of the first signal from the first cell.

9. The wireless device according to claim 6, wherein:
the first measurement of the first signal is configured to be Srxlev;
the first threshold is configured to be $S_{SearchP}$;
the strongest signal value of the first signal measured after the last cell selection or reselection by the wireless device is configured to be $Strongest_{serving}$;
the current measurement of the first signal from the first cell is configured to be $Current_{serving}$;
the second threshold is configured to be $T_{StrongestSrxlev}$; and
the fourth threshold is configured to be $Delta_{SI}$.

10. The wireless device according to claim 6, wherein the wireless communications network operates on at least one of: Narrow Band-Internet of Things, NB-IoT, and enhanced Machine Type Communication, eMTC.

11. A non-transitory computer-readable storage medium, having stored thereon a computer program, comprising instructions which, when executed on at least one processor of a wireless device configured to handle cell selection and/or reselection in a wireless communications network that has a first cell and a second cell, cause the at least one processor to, having determined that a result of a first measurement of a first signal from the first cell is that the first measurement is below a first threshold:
determine that at least one of:
a length of time since the wireless device last performed cell selection or reselection is above a second threshold, and
a number of times that neighbor cell measurements failed to trigger cell reselection is above a third threshold,
reset a strongest signal value of the first signal measured after a last cell selection or reselection by the wireless device, to a lower value based on a first result of the determination of at least one of: the length of time and the number of times, determine whether or not to measure a second signal from the second cell, based on whether or not a difference between: a) the strongest signal value of the first signal measured after the last cell selection or reselection by the wireless device, configured to be reset, and b) a current measurement of the first signal from the first cell, is above a fourth threshold, and
initiate to measure the second signal based on a second result of the determination of whether or not to measure.

12. The non-transitory computer-readable storage medium according to claim 11, wherein the first cell is a serving cell and the second cell is a neighbor cell.

13. The non-transitory computer-readable storage medium according to claim 11, wherein:
the first measurement of the first signal is Srxlev;
the first threshold is SsearchP;
the strongest signal value of the first signal measured after the last cell selection or reselection by the wireless device is Strongestservng;
the current measurement of the first signal from the first cell is Currentserving;
the second threshold is Tstrongestsrxiev; and
the fourth threshold is Deltasi.

14. The non-transitory computer-readable storage medium according to claim 11, wherein the lower value is the current measurement of the first signal from the first cell.

15. The non-transitory computer-readable storage medium according to claim 11, wherein the wireless communications network operates on at least one of: Narrow Band-Internet of Things, NB-IoT, and enhanced Machine Type Communication, eMTC.

* * * * *